US006587920B2

(12) United States Patent
Mekhiel

(10) Patent No.: US 6,587,920 B2
(45) Date of Patent: Jul. 1, 2003

(54) METHOD AND APPARATUS FOR REDUCING LATENCY IN A MEMORY SYSTEM

(75) Inventor: Nagi Nassief Mekhiel, Markham (CA)

(73) Assignee: Mosaid Technologies Incorporated, Kanata (CA)

(*) Notice: Subject to any disclaimer, the term of this patent is extended or adjusted under 35 U.S.C. 154(b) by 0 days.

(21) Appl. No.: 09/725,461

(22) Filed: Nov. 30, 2000

(65) Prior Publication Data
US 2002/0095559 A1 Jul. 18, 2002

(51) Int. Cl.$^7$ .............................................. G06F 13/00
(52) U.S. Cl. ....................................................... 711/118
(58) Field of Search .................................. 711/118, 105

(56) References Cited

U.S. PATENT DOCUMENTS

| | | | |
|---|---|---|---|
| 5,226,139 A | * 7/1993 | Fujishima et al. ............. 711/3 |
| 5,233,702 A | 8/1993 | Emma et al. | |
| 5,261,066 A | 11/1993 | Jouppi et al. | |
| 5,325,508 A | * 6/1994 | Parks et al. ................. 711/118 |
| 5,339,268 A | 8/1994 | Machida | |
| 5,469,558 A | * 11/1995 | Lieberman et al. ......... 710/105 |
| 5,488,709 A | 1/1996 | Chan | |
| 5,588,130 A | * 12/1996 | Fujishima et al. .......... 711/118 |
| 5,640,531 A | 6/1997 | Whittaker et al. | |
| 5,710,905 A | 1/1998 | Wan | |
| 5,734,614 A | * 3/1998 | Tsuruda et al. ........ 365/189.05 |
| 5,778,435 A | 7/1998 | Berenbaum et al. | |
| 5,813,023 A | 9/1998 | McLaury | |
| 5,829,026 A | 10/1998 | Leung et al. | |
| 5,875,451 A | 2/1999 | Joseph | |
| 5,887,272 A | 3/1999 | Sartore et al. | |
| 5,900,011 A | 5/1999 | Saulsbury et al. | |
| 6,065,099 A | 5/2000 | Clark et al. | |
| 6,243,279 B1 | * 6/2001 | Maesako et al. ............... 365/49 |

FOREIGN PATENT DOCUMENTS

| | | |
|---|---|---|
| DE | 197 14 681 | 10/1997 |
| EP | 0 843 261 A2 | 5/1998 |
| EP | 0 911 731 A2 | 4/1999 |
| WO | WO 00 22531 | 4/2000 |

OTHER PUBLICATIONS

Betty Price. High Performance Memories. John Wiley & Sons, 1996 Chapter 4 excerpt "Fast Cache Memory".
Betty Price. High Performance Memories. John Wiley & Sons, 1996 Chapter 6 excerpt "New Architectures for Fast DRAMs".
Anonymous: "MICROPD4565161 Product Brief and Data Sheet"—Internet.

* cited by examiner

Primary Examiner—David L. Robertson
(74) Attorney, Agent, or Firm—Shapiro Cohen; Dennis R. Haszko; Harold C. Baker

(57) ABSTRACT

A memory controller controls a buffer which stores the most recently used addresses and associated data, but the data stored in the buffer is only a portion of a row of data (termed row head data) stored in main memory. In a memory access initiated by the CPU, both the buffer and main memory are accessed simultaneously. If the buffer contains the address requested, the buffer immediately begins to provide the associated row head data in a burst to the cache memory. Meanwhile, the same row address is activated in the main memory bank corresponding to the requested address found in the buffer. After the buffer provides the row head data, the remainder of the burst of requested data is provided by the main memory to the CPU.

14 Claims, 12 Drawing Sheets

METHOD AND APPARATUS FOR REDUCING LATENCY IN A MEMORY SYSTEM

FIELD OF THE INVENTION

The invention generally relates to a method for transferring data between a central processing unit (CPU) and main memory in a computer system. More specifically, the invention describes various implementations for minimizing the latency in accessing main memory by using a latency hiding mechanism.

BACKGROUND OF THE INVENTION

Microprocessor speed and computing power have continuously increased due to advancements in technology. This increase in computing power depends on transferring data and instructions between a main microprocessor and the main memory at the processor speed. Unfortunately, current memory systems cannot offer the processor its data at the required rate.

The processor has to wait for the slow memory system by using wait states, thereby causing the processor to run at a much slower speed than its rated speed. This problem degrades the overall performance of the system. This trend is worsening because of the growing gap between processor speeds and memory speeds. It may soon reach a point where any performance improvements in the processor cannot produce a significant overall system performance gain. The memory system thus becomes the limiting factor to system performance.

According to Amdahl's law, the performance improvement of a system is limited by the portion of the system that cannot be improved. The following example illustrates this reasoning: if 50% of a processor's time is spent accessing memory and the other 50% is spent in internal computation cycles, Amdahl's law states that for a ten fold increase in processor speed, system performance only increases 1.82 times. Amdahl's Law states that the speedup gained by enhancing a portion of a computer system is given by the formula $$\text{Speedup} = \frac{1}{(1 - \text{Fraction\_enhanced}) + \frac{\text{Fraction\_enhanced}}{\text{Speedup\_enhanced}}}$$

where

Fraction_enhanced is the proportion of time the enhancement is used

Speedup_enhanced is the speedup of the portion enhanced compared to the original performance of that portion.

Thus, in the example, since the processor is occupied with internal computation only 50% of the time, the processor's enhanced speed can only be taken advantage of 50% of the time.

Amdahl's Law, using the above numbers, then becomes, $$\text{Speedup} = \frac{1}{(1 - 0.5) + \frac{0.5}{10}} = 1.82$$

This is because the enhancement can only be taken advantage of 50% of the time and the enhanced processor is 10 times the speed of the original processor. Calculating the speedup yields the overall performance enhancement of 1.818 times the original system performance.

If the enhanced processor is 100 times the speed of the original processor, Amdahl's Law becomes $$\text{Speedup} = \frac{1}{(1 - 0.5) + \frac{0.5}{100}} = 1.98$$

This means that the system performance is limited by the 50% of data accesses to and from the memory. Clearly, there is a trend of declining benefit as the speed of the processor increases vs. the speed of the main memory system.

The well known cache memory system has been used to solve this problem by moving data most likely to be accessed by the processor to a fast cache memory that can match the processor speed. Various approaches to creating a cache hierarchy consisting of a first level cache (L1 cache) and a second level cache (L2 cache) have been proposed. Ideally, the data most likely to be accessed by the processor should be stored in the fastest cache level. Typically, both Level 1 (L1) and Level 2 (L2) caches are implemented with static random access memory (SRAM) technology due to its speed advantage over dynamic random access memory (DRAM). The most crucial aspect of cache design and the problem which cache design has focused on, is ensuring that the data next required by the processor has a high probability of being in the cache system. Two main principles operate to increase the probability of finding this required data in the cache, or having a cache "hit": temporal locality and spatial locality. Temporal locality refers to the concept that the data next required by the processor has a high probability of being required again soon for most average processor operations. Spatial locality refers to the concept that the data next required by the processor has a high probability of being located next to the currently accessed data. Cache hierarchy therefore takes advantage of these two concepts by transferring from main memory data which is currently being accessed as well as data physically nearby.

However, cache memory systems cannot fully isolate a fast processor from the slower main memory. When an address and associated data requested by the processor is not found in the cache, a cache "miss" is said to occur. On such a cache miss, the processor has to access the slower main memory to get data. These misses represent the portion of processor time that limits overall system performance improvement.

To address this cache miss problem, Level 2 cache is often included in the overall cache hierarchy. The purpose of Level 2 cache is to expand the amount of data available to the processor for fast access without increasing Level 1 cache, which is typically implemented on the same chip as the processor itself. Since the Level 2 cache is off-chip (i.e. not on the same die as the processor and Level 1 cache), it can be larger and can run at a speed between the speed of the Level 1 cache and the main memory speed. However, in order to properly make use of Level 1 and Level 2 cache and maintain data coherency between the cache memory system and the main memory system, both the cache and the main memory must be constantly updated so that the latest data is available to the processor. If the processor memory access is a read access, this means that the processor needs to read data or code from the memory. If this requested data or code is not to be found in the cache, then the cache contents have to be updated, a process generally requiring that some cache contents have to be replaced with data or code from main memory. To ensure coherency between the cache contents and the contents of main memory, two techniques are used: write-through and write-back. The write-through technique involves writing data to both the cache and to main memory when the processor memory access is a write access and when the data being written is to be found in the cache. This technique ensures that, whichever data is accessed, either the cache contents or the main memory, the data accessed is identical. The write-back technique involves writing data only to the cache in a memory write access. To ensure coherence between the data in the cache and the data in main memory, the cache contents of a particular cache location are written to main memory when these cache contents are about to be overwritten. However, cache contents are not written to main memory if they have not been replaced by a memory write access. To determine if the cache contents of a particular cache location have been replaced by a memory write access, a flag bit is used. If the cache contents have been replaced by a memory write access, the flag bit is set or is considered "dirty". Thus, if the flag bit of a particular cache location is "dirty", then the cache contents of that cache location have to be written to main memory prior to being overwritten with new data.

Another approach for increasing the cache hit rate is by increasing its associativity. Associativity refers to the number of lines in the cache which are searched (i.e. checked for a hit) during a cache access. Generally, the higher the associativity, the higher the cache hit rate. A direct mapped cache system has a 1:1 mapping whereby during a cache access, only one line is checked for a hit. At the other end of the spectrum, a fully associative cache is typically implemented using a content addressable memory (CAM) whereby all cache lines (and therefore all cache locations) are searched and compared simultaneously during a single cache access. Various levels of associativity have been implemented.

Despite these various approaches to improving cache performance aimed at ultimately improving overall system performance, it should be noted that cache performance can only be improved up to a point by changing its parameters such as size, associativity, and speed. This approach of focusing on improving the cache system or the fast memory of the system rather than trying to improve the slower main memory, eventually reaches a saturation point—any further attempts at improving overall system performance through cache system improvements will generate decreasing levels of system performance improvement. Conceivably, main memory performance could be eliminated as a factor in overall system performance if the cache is made as large as main memory, but this would be prohibitively expensive in terms of silicon chip area. As a result, what is needed is a way of obtaining maximum system performance with a minimum sized cache.

This speed mismatch between processors and main memory has recently been exacerbated by new software applications such as multimedia which depend heavily on main memory performance. Unfortunately, main memory performance is limited by the frequent random data access patterns of such applications. Cache systems are therefore less effective when used with these applications.

To alleviate the speed mismatch between processors and main memory, numerous attempts at improving main memory performance have been carried out. These have yielded some improvements in main memory speed. Early improvements to DRAM involved getting multiple bits out of the DRAM per access cycle (nibble mode, or wider data pinout), internally pipelining various DRAM operations, or segmenting the data so that some operations would be eliminated for some accesses (page mode, fast page mode, extended data out (EDO) mode).

Page mode involves latching a row address in the DRAM and maintaining it active, thereby effectively enabling a page of data to be stored in the sense amplifiers. Unlike in page mode where column addresses are then strobed in by the Column Address Strobe signal CAS\ in fast page mode, the column address buffers are activated as soon as the Row Address Strobe RAS\ signal is activated, and act as transparent latches, allowing internal column data fetch to occur before column address strobe. The enabling of the data output buffer is then accomplished when CAS\ is activated. These different page modes are therefore faster than pure random access mode since the row address activation time required for accessing new rows is eliminated by staying on the same row.

Subsequent improvements were realized through extended data out mode or EDO mode and in burst EDO mode. Burst EDO mode allows a page of sequential data to be retrieved from the DRAM without having to provide a new address on every cycle. However, it should be noted that while burst EDO mode is useful for graphics applications which require pages of sequential information, it is less useful for main memory applications which require random access to still be fully supportable.

Although such improvements in DRAM designs offer higher bandwidth access, they suffer from the following problems:

processors cannot fully utilize the new DRAM higher bandwidth because some scattered memory accesses do not map in the same active row, thereby obviating gains from using fast page mode;

although new DRAM designs may have several banks, they are not in sufficient numbers for a typical processor environment with scattered memory accesses to have high page hit rates;

current processors and systems use large caches (both first and second level) that intercept memory accesses to the DRAM thereby reducing the locality of these accesses—this further scatters the accesses and consequently further reduces page hit rates.

The inability of cache systems to improve system performance have motivated further efforts to improve the performance of the main DRAM memory system. One of these efforts yielded the SDRAM, (Synchronous DRAM). SDRAM uses multiple banks and a synchronous bus to provide a high bandwidth for accesses which use the fast page mode. With multiple SDRAM banks, more than one active row can supply the processor with fast accesses from different parts of memory. However, for fast page mode to be used, these accesses have to be in an active row of a bank. Furthermore, relying solely on accessing multiple banks to increase memory bandwidth results in an overall limitation based on the number of banks that the memory can be divided into.

In general, a limited number of banks, external cache systems which intercept accesses to already activated rows in main memory and poor spatial localities of the accessed data all contribute to limiting the performance gain from the SDRAM.

Another effort yielded the Cache DRAM (CDRAM). This design incorporates an SRAM-based cache inside the DRAM. Large blocks of data can thus be transferred from the cache to the DRAM array or from the DRAM to cache in a single clock cycle. However, this design suffers from problems of low cache hit rate inside the DRAM caused by the external intercepting caches, and poor data localities. It also adds complexity to the external system for controlling and operating the internal cache by requiring a cache tag, a comparator and a controller. In addition, there is a significant cost in terms of die area penalty for integrating SRAM cache with a DRAM in a semiconductor manufacturing process optimized for DRAM.

Newer designs merge processor and DRAM by eliminating the intercepting cache problem and exposing the full DRAM bandwidth to the processor. This approach increases system complexity, mixes slow and fast technology, limits the space for the processor, and cannot fully utilize the high DRAM bandwidth because of the nature of scattered memory accesses used by the current programming model.

The new Virtual Channel DRAM design from NEC uses 16 fully associative channels, implemented with fast SRAM, to track multiple code and data streams in use by various sources. Essentially Virtual Channel DRAM represents an extension of the page mode concept where the one bank/one page restriction is removed. As a result, a number of channels (or pages) can be opened within a bank independently of other channels. A CPU can for example access up to 16 lk channels randomly allocated within a virtual channel DRAM bank. As a result, memory traffic between multiple devices can be sustained without causing repeated page allocation conflicts. The Virtual Channel Memory requires that the main memory location corresponding to each channel be tracked by the CPU, thereby complicating its controlling function. In addition the CPU requires a predictive scheme for effective prefetching of data to the channels. Virtual Channel DRAM uses Fast Page mode to transfer data to channels and finally, like the Cache DRAM, VC DRAM is expensive due to the additional die area consumed by the associative buffers. In addition, the amount of cache provided may not be appropriate for some applications because the cache/DRAM ratio is usually fixed. For example, when main memory is upgraded, the additional cache may not be necessary so the system cost is unnecessarily high.

Recently, software-based solutions have also been proposed such as using a software compiler to re-map physical memory addresses in order to maximize DRAM bandwidth. While this is useful for specific applications that have predictable behaviour, it requires changing software, thereby causing compatibility problems. These efforts use a high level approach whereby the source code of an application is revised to make the software be tailored to the hardware. Not only is this approach expensive and time consuming, it is not applicable to all software applications.

From the above, what is therefore needed is a solution based on a simplified memory control mechanism, using a simple, cost effective standard DRAM for main memory, requiring the minimum of hardware, and not requiring extensive software rewrites or a complex addressing scheme. Such a solution should ideally take advantage of both temporal and spatial localities. Not only should recently accessed data be readily accessible but data adjacent in location to such recently accessed data should also be readily accessible.

SUMMARY OF THE INVENTION

A solution to the above problems can be found in a method and apparatus which takes advantage of both fast page mode and fast buffer or cache concepts. A memory controller controls a buffer which stores the most recently used addresses and associated data, but the data stored in the buffer is only a portion of a row of data (termed row head data) stored in main memory. In a memory access initiated by the CPU, both the buffer and main memory are accessed simultaneously. If the buffer contains the address requested, the buffer immediately begins to provide the associated row head data in a burst to the cache memory. Meanwhile, the same row address is activated in the main memory bank corresponding to the requested address found in the buffer. After the buffer provides the row head data, the remainder of the burst of requested data is provided by the main memory to the CPU. In this manner, a small amount of buffer memory can provide the functionality of a much larger amount of L2 cache.

In a first aspect the present invention provides a method of retrieving data from a-memory system, said method comprising:
  (a) receiving a read request for data contents of a memory location;
  (b) searching a buffer portion of said memory system for a portion of said data contents;
  (c) in the event that said portion of said data contents is stored in said buffer, retrieving said portion from said buffer while concurrently retrieving a remaining portion of said data contents from a main memory portion of said memory system; and
  (d) in the event that said portion of said data contents is not stored in said buffer, retrieving said portion and said remaining portion of said data contents from main memory.

In a second aspect the present invention provides a row head buffer circuit for latching a row head, a row head being a portion of a memory row stored in a memory bank, said latching circuit comprising:
  a row head buffer containing a plurality of row head entries, each row head entry corresponding to a row head in a memory bank;
  a plurality of row address latches, each row address latch latching a physical address of a row head entry contained in the row head buffer;
  a row address comparator for comparing row head entries with an incoming requested row address,
wherein
  said buffer circuit compares an incoming row address requested by a memory controller with said plurality of row address latches, in the event an incoming requested row address matches one of said plurality of address latches, a row head data entry corresponding to a matching address latch is transmitted to said memory controller.

In a third aspect the present invention provides a memory buffer subsystem comprising:
  at least one buffer bank having multiple buffer entries; and
  a buffer controller controlling said buffer subsystem,
wherein
  each buffer entry comprises:
    an address field containing a memory address corresponding to a location in a main memory bank;
    a data field containing the first n bytes of data located at said main memory bank address;
    when said data located at said main memory bank address is requested by a CPU, said first n bytes of data is provided by said buffer subsystem to said CPU while the rest of said data is retrieved from said memory address in the main memory bank.

In a fourth aspect the present invention provides a memory system comprising:
  at least one bank of main memory;

a memory controller;

a buffer; and a buffer controller, wherein said memory controller controls the at least one bank of main memory;

said buffer contains a plurality of buffer entries, each buffer entry including an address portion and a data portion;

said data portion comprises a first portion of data in the at least one bank of main memory, said address portion comprising an address referencing the memory location.

BRIEF DESCRIPTION OF THE DRAWINGS

A better understanding of the invention may be obtained by reading the detailed description of the invention below, in conjunction with the following drawings, in which.

DESCRIPTION OF THE PREFERRED EMBODIMENT

Figure 1:
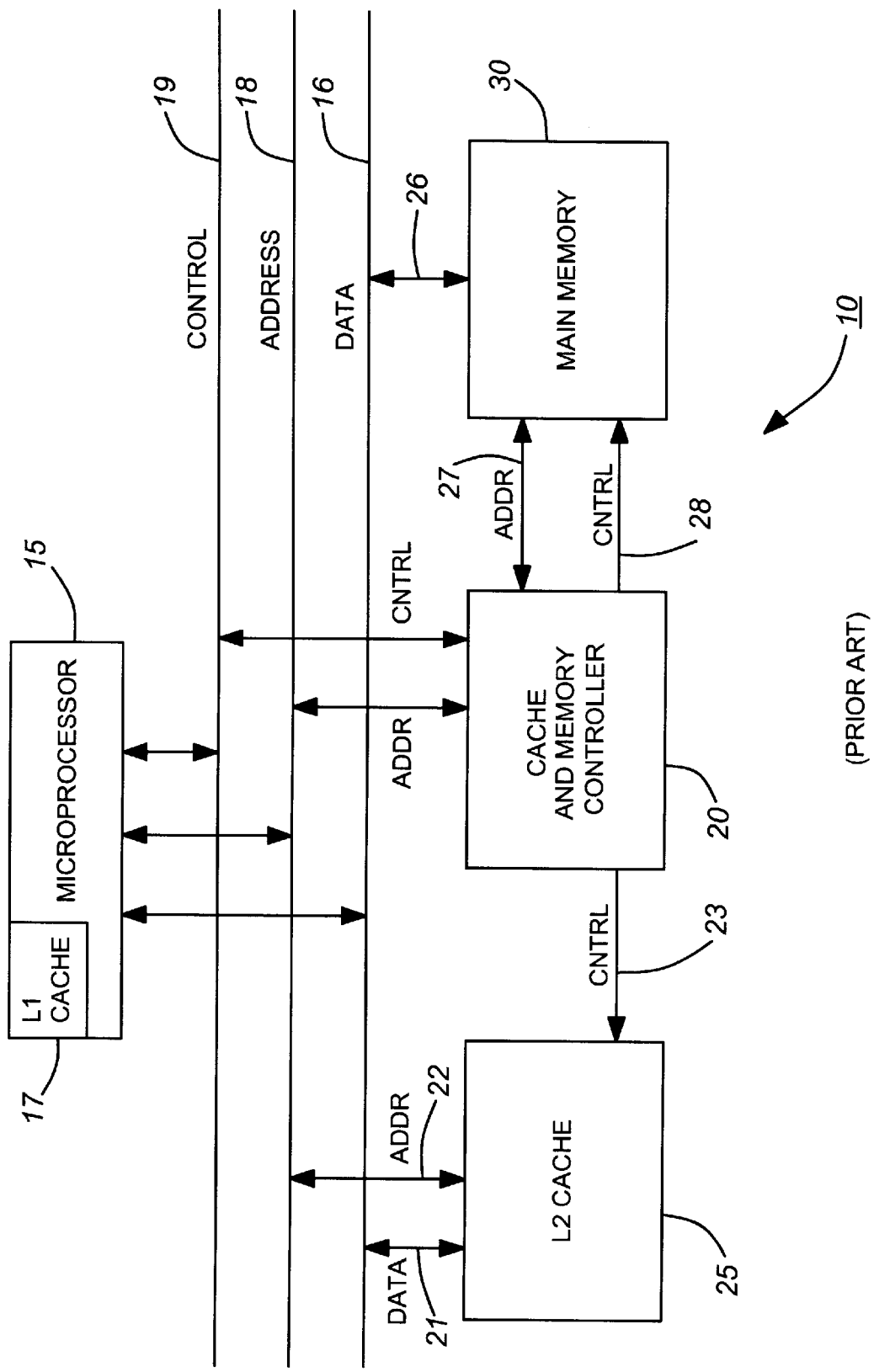
FIG. 1 is a schematic block diagram of a CPU-memory system according to the prior art.

Referring to FIG. 1, a conventional CPU-main memory system 10 is illustrated for the purposes of putting into context the discussion of the present invention. The system consists generally of a CPU 15, having a built-in Level 1 cache 17, a cache and main memory controller 20, a Level 2 cache 25, and a main memory 30. A host data bus 16 transfers data between CPU and main memory 30 and Level 2 cache 25. A host control bus 19 transfers control signals between CPU 15 and memory controller 20. A host address bus 18 provides the memory controller 20 and the Level 2 cache 25 with address information. Similarly, a data bus 21 and an address bus 22 connect the Level 2 cache to the host data 16 and address 15 buses under the control of the cache and memory controller 20 via control bus 23. The main memory 30 is coupled to the host data bus 16 via memory data bus 26 and receives address and control information from the controller 30 via address bus 27 and control bus 28.

In a typical read/write data operation, the CPU 15 issues a read data instruction to the memory controller 20 for example, and provides an address location which the controller converts into row and column addresses and memory control signals. The controller 20 also generates address and control information for the Level 2 cache. If the data is not found in the Level 1 cache, the controller 20 would search for the desired data in the Level 2 cache as well as in the main memory. If the data is found in the Level 2 cache, it would be provided via data bus 21 to the host data bus 16 which in turn would provide the data back to the CPU 15. The data would simultaneously be written into the Level 1 cache in anticipation of requiring it again. If the data is not found in the Level 1 cache or the Level 2 cache—i.e. a cache miss occurs in both Level 1 and Level 2 cache, the controller 20 would be forced to access the data directly from main memory 30 using page mode access. Simultaneously, as the data is transferred to the CPU 15 via memory data bus 26, it would also be copied into the Level 1 cache 17 in anticipation of the CPU requiring that data again.

As described above, such a conventional system consisting of Level 1 and Level 2 cache and a memory controller is beginning to exhibit symptoms of decreasing performance. Today's applications demand more speed and randomness and thereby force more frequent cache misses and main memory accesses.

Figure 2A:
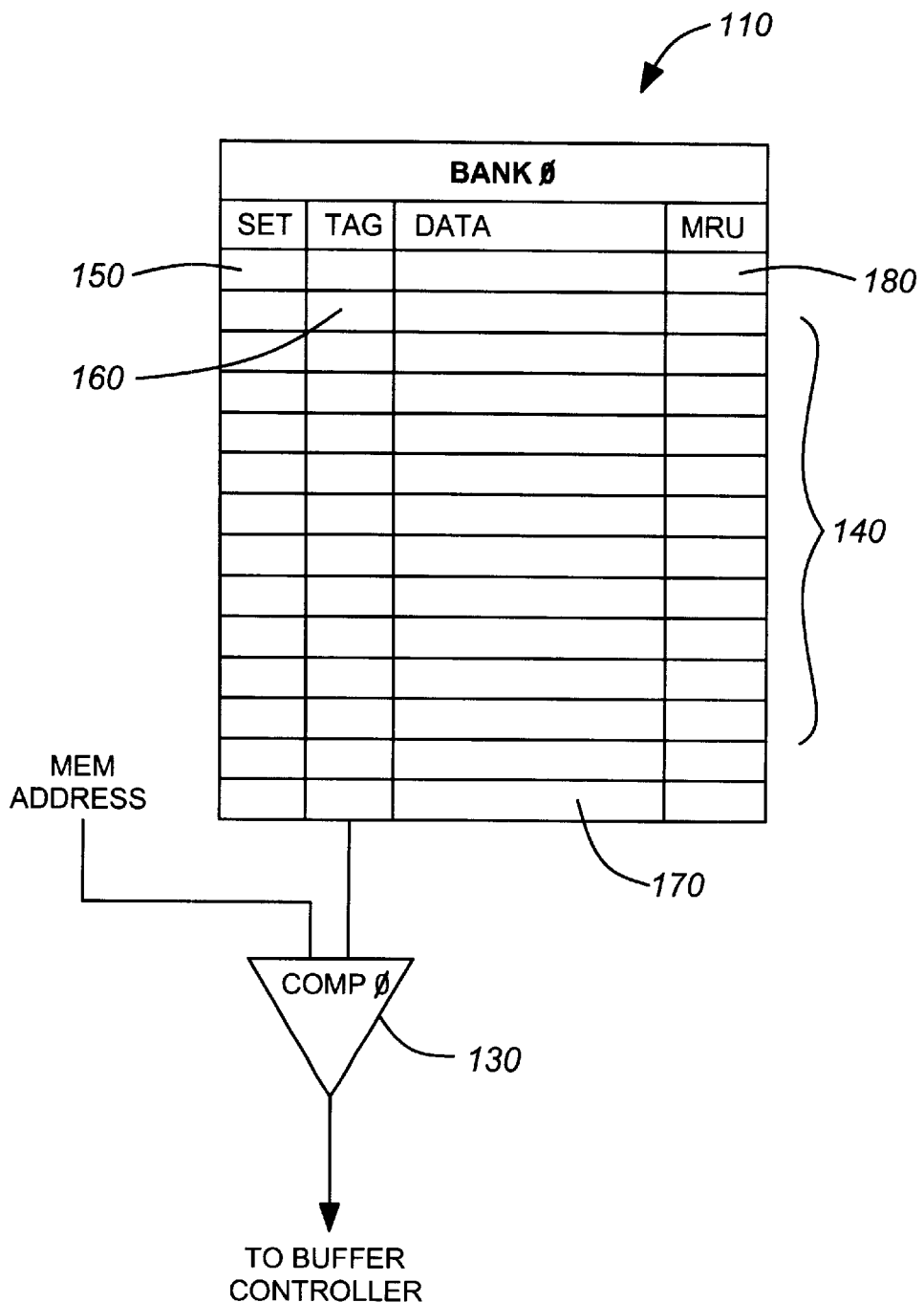
FIG. 2A is a schematic diagram of a buffer bank according to the invention.
Figure 2B:
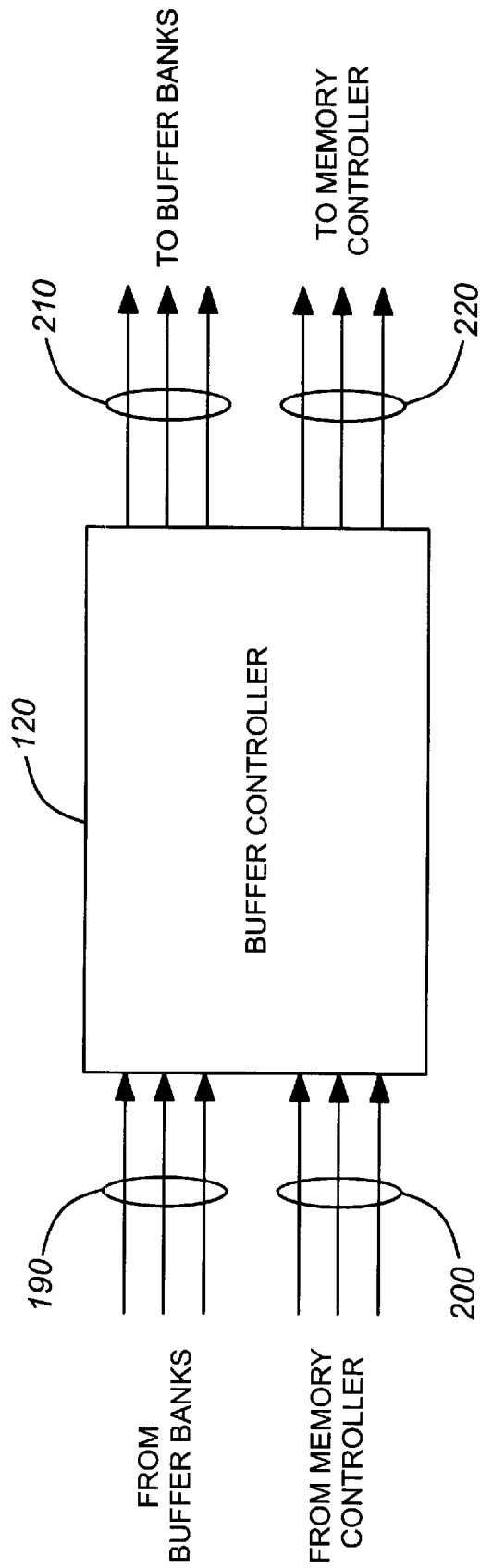
FIG. 2B is a block diagram of a buffer controller controlling the buffer bank of FIG. 2A.

Referring to FIGS. 2A and 2B, a latency hiding buffer according to an embodiment of the invention is illustrated. This buffer can be used with the CPU—main memory system in FIG. 1.

The buffer consists of at least one buffer bank 110 and a buffer controller 120.

Each of the buffer banks, according to an embodiment of the invention, are implemented using N-way set associative cache memory comprising a plurality of tines 140 and each buffer has a comparator 130 for comparing a requested address with stored addresses in the buffer bank. Each line includes a set 150 and tag 160 address portion, a most recently used MRU flag bit 180, and a data portion 170. The set portion 150 refers to the lower order bits of a main memory address location stored in the buffer line. The tag portion 160 refers to the higher order bits of the main memory address location stored in the buffer line. Typically, as with most set associative cache systems, the buffer controller will use the set bits to address the higher order tag bits. The MRU flag bit 150 is used to determine which buffer entry should not be replaced when a new address entry is to be inserted. The data portion contains data (row head) associated with the memory address specified by the set and tag bits. In one embodiment, the row head contains only a portion of a desired number of data bits in row of data in main memory—for example, the buffer bank 110 could store the first four data words of a typical 64 byte cache line as the row head and the remainder of the data would be stored in main memory. As a result, the buffer bank could store ¼ of a cache line or some fraction of a full cache line.

With respect to the MRU flag 180, a buffer bank entry with the MRU flag bit set is the most recently used entry and should not be replaced. This is because temporal locality of reference indicates that this entry may be the next entry to be accessed. For a subsequent requested address the buffer will be searched for an entry without the MRU flag bit set. Since the MRU flag bit is set for a particular buffer entry after the buffer entry has been accessed, if an old buffer entry has its MRU flag bit set, this old buffer entry then resets its MRU flag bit, leaving the new buffer entry as the only entry with a set MRU flag bit. There can only be one MRU flag bit active for each associative set in the buffer.

To illustrate the operation of the buffer bank an example is provided: the buffer bank receives a decoded memory address from a main memory controller. The low order bits of this memory address are used to determine which buffer bank and which set in that bank may be a match. The high order bits of that memory addresses are provided to the comparator 130. The tag field of the chosen buffer line is also provided to the comparator 130. If there is a match, then the requested memory address matches that stored in the buffer line. The result is then reported to the buffer controller and the data is accessed in the buffer.

Referring to FIG. 2B, buffer controller 120 is illustrated. A first group of signals 190 are provided from the buffer banks and can include the outputs of the address comparators (whether there is an address match or not) and whether a chosen buffer line has its MRU set or not. A second group of signals 200 are provided from the main memory controller. These can include such signals as the presence of a memory access request, whether the memory access is a read or a write, and whether a requested row is active or not.

A third group of signals 210 are generated by the buffer controller and provided to the buffer banks. These can include read or write signals to the buffer banks, and MRU bit settings. A fourth group of signals 220 are generated by the buffer controller and provided to the memory controller. These can include signals which instruct the memory controller to latch a specific row in main memory, write data to a location in main memory or access a location in main memory with a specified offset.

The above described buffer can be placed in various parts of the CPU memory system illustrated in FIG. 1. Referring to FIGS. 3A, 3B and 3C and 3D four possible locations for the latency hiding buffer are illustrated.

Figure 3A:
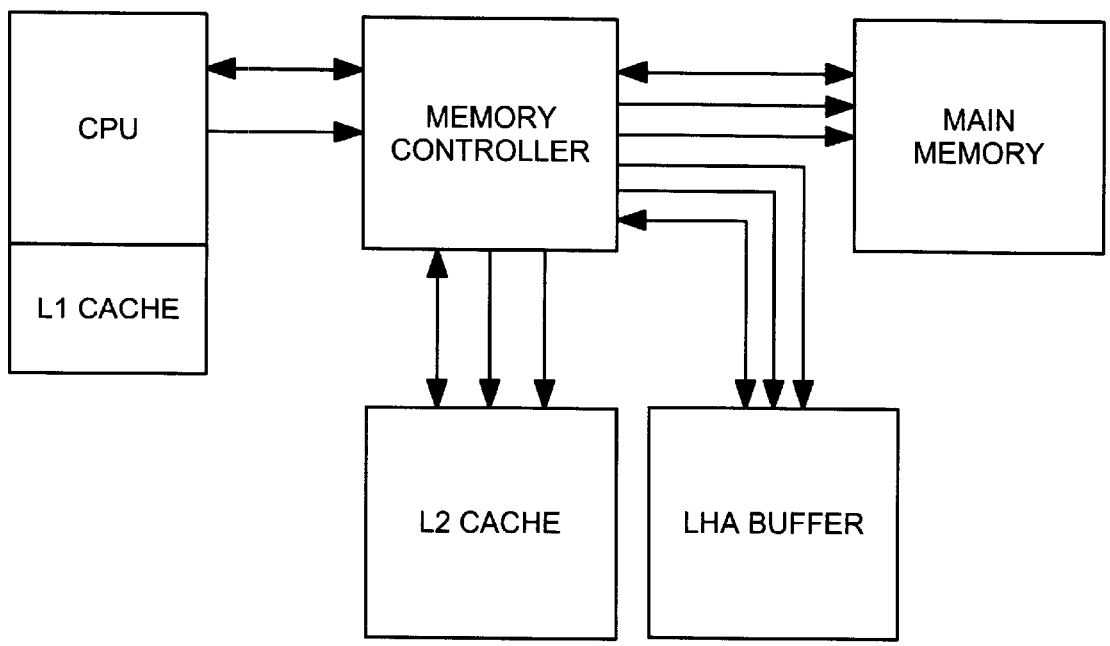
FIG. 3A is a block diagram of a memory system implementing the buffer system separate from the memory controller.
Figure 3B:
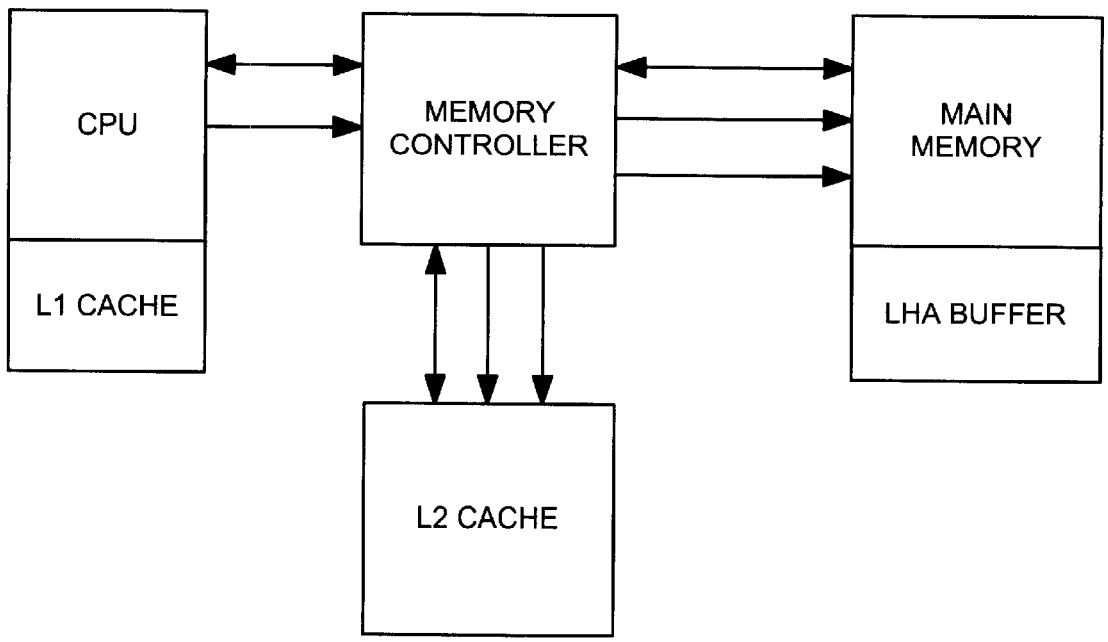
FIG. 3B is a block diagram of a memory system implementing the buffer system as part of the main memory.
Figure 3C:
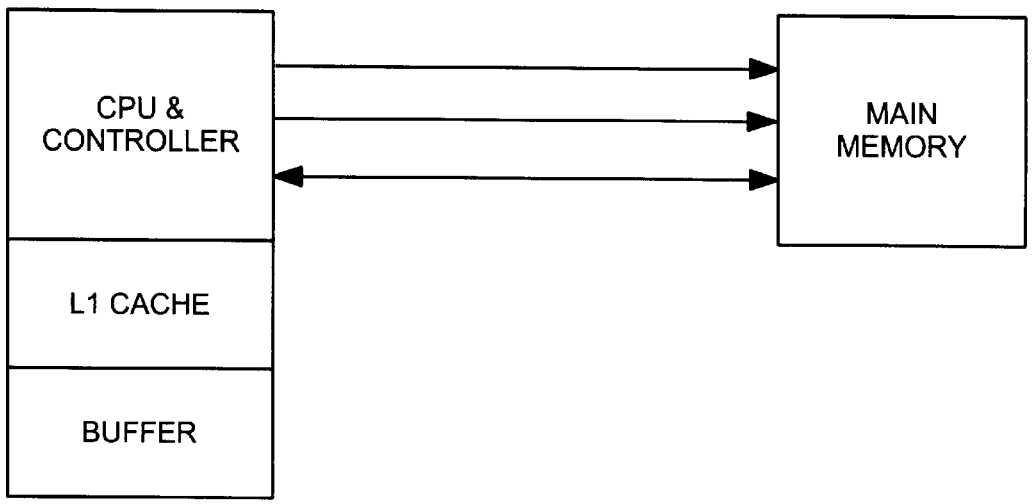
FIG. 3C is a block diagram of a memory system implementing the buffer system as part of the CPU.
Figure 3D:
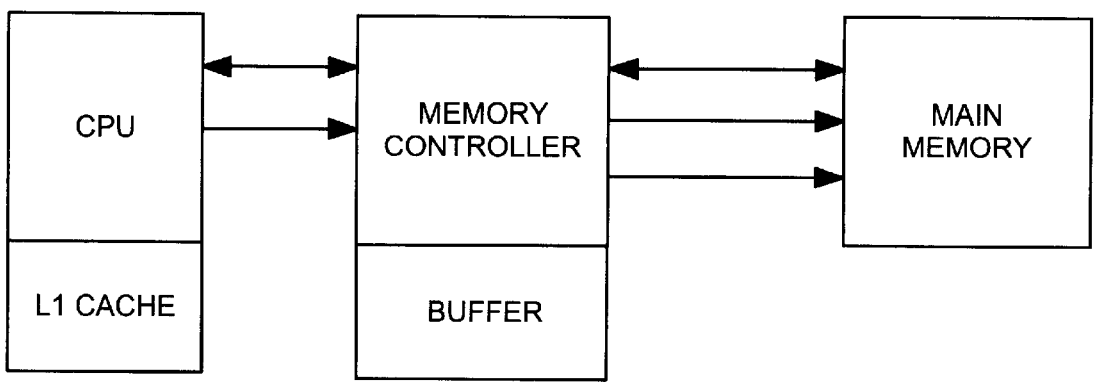
FIG. 3D is a block diagram of a memory system implementing the buffer system as part of the memory controller.

FIG. 3A consists of all the elements of FIG. 1 with the latency hiding buffer 100 located external to the memory controller 120. As well known to those skilled in the art, each of the blocks in FIG. 3A could be implemented on a separate chip or module. As an example, the main memory is typically implemented using a main memory DIMM module (Dual Inline Memory Module), and the CPU and Level 1 cache are typically implemented in a single monolithic microprocessor. The memory controller typically a separate chip, is usually combined together with the microprocessor in a chipset which includes the Level 2 cache as a separate chip. In the implementation shown in FIG. 3A, the latency hiding buffer is implemented on an additional chip integrated into the chipset, possibly replacing the Level 2 cache, or used in conjunction with the Level 2 cache. FIG. 3B illustrates another possible implementation with the buffer integrated on the same chip as the DRAM-based main memory. FIG. 3C illustrates an implementation having the buffer integrated on the same chip as the Level 1 cache and the CPU. Finally, FIG. 3D illustrates the preferred embodiment with the buffer integrated with the memory controller and replacing the Level 2 cache altogether. Although these four combinations have been shown, those skilled in the art will conceive of other possible combinations which employ the benefits and concept of the buffer as described herein.

Figure 4:
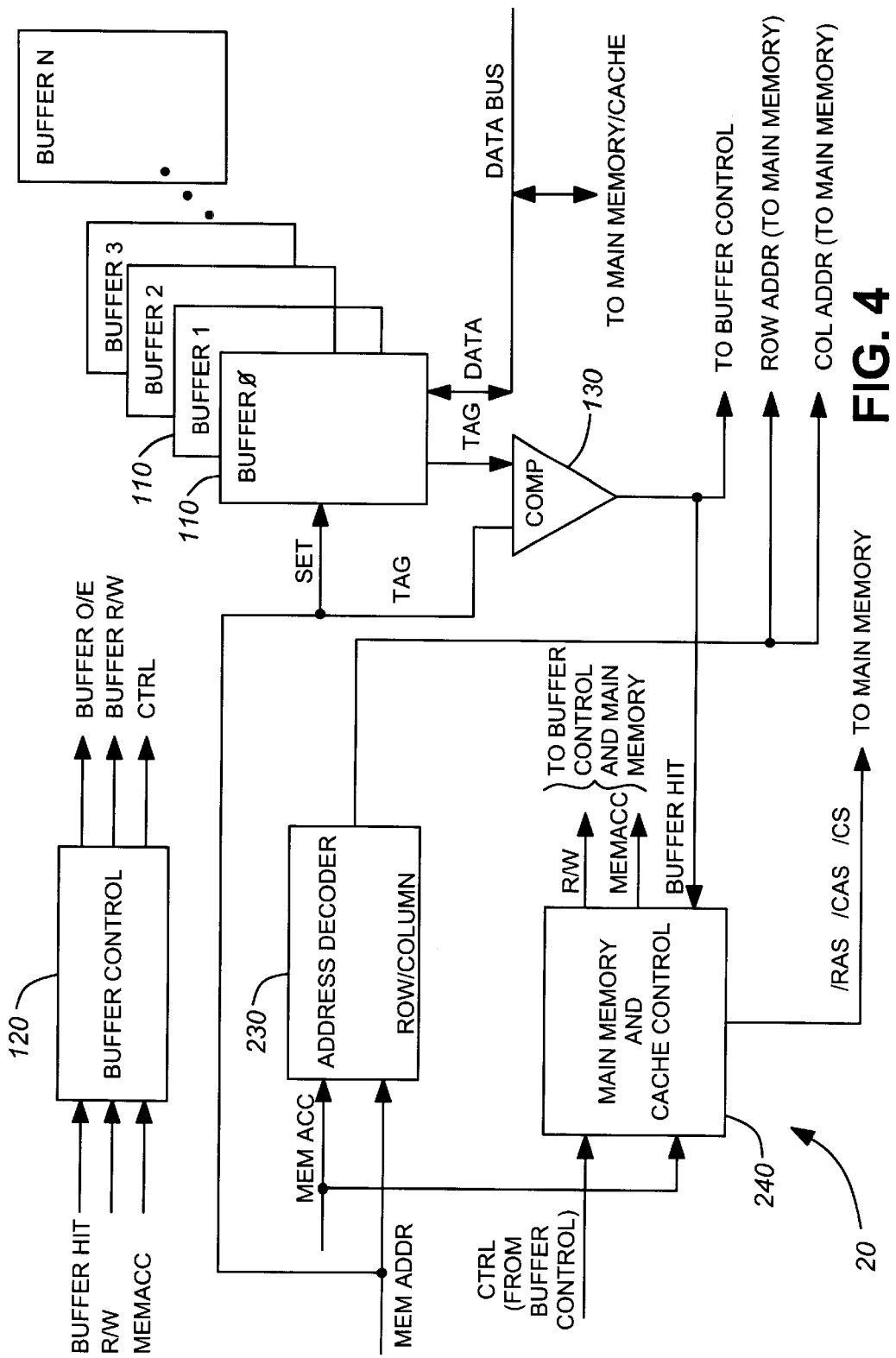
FIG. 4 is a detailed block diagram of an implementation of the invention.

FIG. 4 is a more detailed illustration of a preferred embodiment of the present invention corresponding to FIG. 3D. As can be seen in FIG. 4, multiple buffer banks 110 are integrated in the memory controller 20. It should be noted that, while only one comparator 130 is illustrated in FIG. 4, each of the buffer banks 110 has a comparator associated with it.

The memory controller 20 according to a preferred embodiment of the invention comprises the following components: an address decoder 230, a main memory and cache controller 240, buffer banks 110, comparators 130 and buffer controller 120. The address decoder 230 receives the requested address (MemAddr) and the memory access signal (MemAcc) from the CPU. The address decoder 230 then determines, from the requested memory address, the row address and the column address of the requested address in the main memory.

The requested memory address is also sent to the buffer 110. As can be seen, a portion of the requested memory address (set) is used to reference the buffer banks 110. Another portion of the same requested memory address (tag) is sent to the comparators 130. The comparator 130 compares the tag field of the requested address with the tag stored at the set location in the buffer 130. If the tag of the requested address matches with the tag at the set location in cache, then a buffer hit has occurred. If the locations do not match, then a buffer miss has occurred. The set field is used to index the tag fields within the buffer 110. Since the buffers 110 are implemented using an N-way set associative cache memory, this search and compare operation occurs across all N buffers simultaneously, yielding N comparison results BufferHit from comparators 130. The comparison results BufferHit are input into the buffer control block 120, which generates control signals Buffer O/E, Buffer R/W, and CTRL and to the main memory cache control block 240. If there is a match, then the comparator 130 indicates as such to the main memory and cache controller 240 via the BUFFER HIT line. The main memory and cache control 240 receives the control signals (CTRL) from the buffer controller 120 and the MemAcc signal from the CPU. The main memory and cache control 240 generates the required signals to activate and access the main memory based on the control signals received. These required signals include the /RAS (row address strobe), /CAS (column address strobe) and the /CS (chip select) signals. These signals are well known to those versed in the art.

Figure 5:
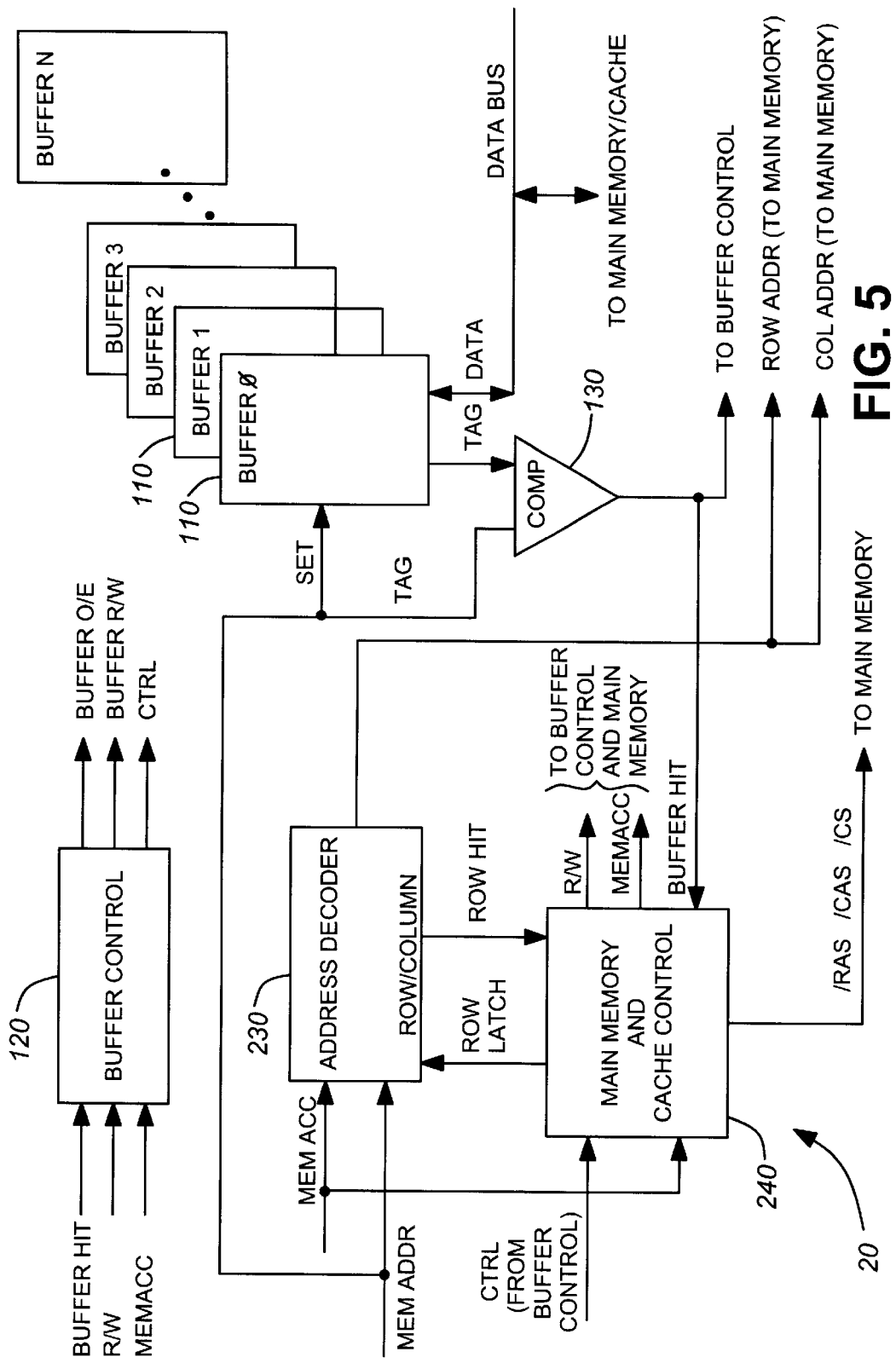
FIG. 5 is a detailed block diagram of a variant of the implementation illustrated in FIG. 4.

Referring to FIG. 5, the memory controller of FIG. 4 is illustrated with two more signals present: row latch and row hit. Row latch is a signal generated by the main memory and cache control 240 and provided to the address decoder 230 instructing the address decoder 230 to latch/activate until further notice the row currently being accessed. The row hit signal, generated by the address decoder 230 and provided to the main memory and cache control 240, indicates to the main memory and cache control 240 that the requested row is already latched. It should be noted that the memory controller of FIGS. 4 and 5 can both be used for memory system which may or may not have a level 2 (L2) cache.

For clarification it should be noted that the data in the buffer entry may be the first few bytes stored at the requested memory address. Thus, while the CPU is being provided with this data, the rest of the data in the requested memory address is retrieved from main memory/cache.

Alternatively, the data in the buffer entry may be enough to fill a cache line in the memory system's cache. Thus, on a buffer hit (when the requested memory address is found to be in the buffer), the buffer would provide the whole cache line to the cache. To assist in this process, the latching of the requested row address (decoded from the requested address) may be accomplished in the background. To clarify, the row address may be latched in the main memory regardless of whether there is a buffer hit or not. This way, if the next requested address is not in the buffer but is in the same row as the previous requested address, the relevant row is already active, thereby saving the setup and activation time normally associated with main memory accesses. It should be noted that the methods which use this row latching would use the memory controller of FIG. 5 while those methods which do not would use the memory controller of FIG. 4. As can be seen, the FIG. 5 controller has two extra signals—ROW HIT and ROW LATCH. The ROW HIT would indicate to the main memory/cache controller 240 that the row requested (through the requested memory address) is already latched. The ROW LATCH signal serves to notify the address decoder 230 that it needs to latch a specific row in the main memory system.

Figure 6:
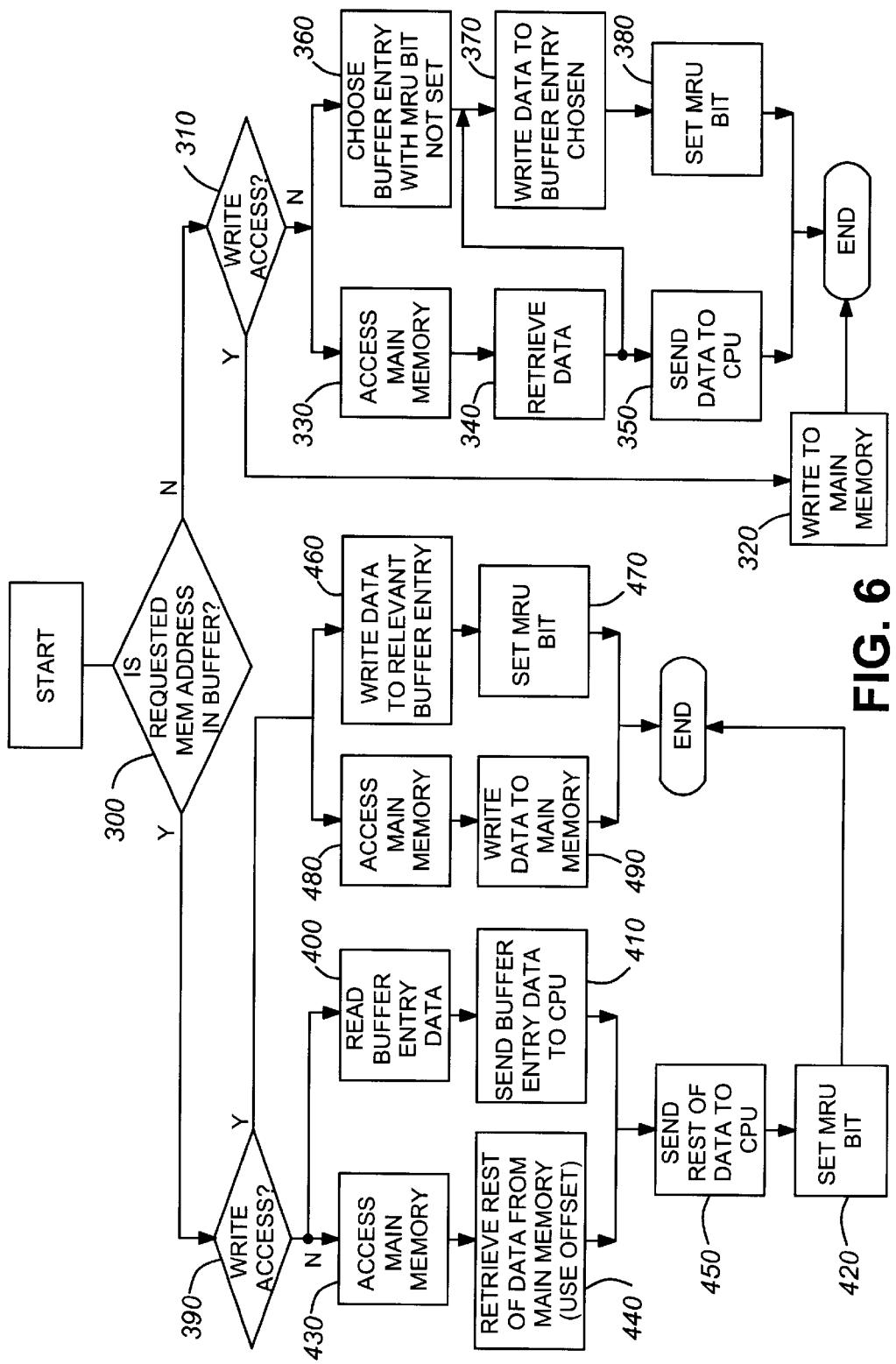
FIG. 6 is a flow chart detailing the steps in a method of memory access according to a first aspect of the invention.

Referring to FIG. 6, a flow chart illustrating the operation of the memory subsystem of FIG. 4 is shown. It should be noted that the preliminary steps for a memory access have been omitted from the flow chart in the interests of brevity. The steps of receiving the requested memory address, decoding the memory address and receiving the memory access request are well known in the field and need no elaboration here. As can be seen, the process starts with the decision 300 which determines whether the requested memory address is found in the buffer.

Decision 310 is then accomplished—this determines whether the memory access is a read or a write access. If the access is a memory write, step 320 is followed. Step 320 executes the write to the main memory. The buffer is not involved in this step as illustrated. As an alternative, one may choose to write the data to be written to main memory to a buffer entry. This would involve the normal steps required in accessing the buffer, steps which will be explained in detail later.

If the memory access is a read access, the buffer is utilized and the temporal parallelism as referred above is exploited. Where two or more arrows feed into a subsequent action, all 2 or more preceding actions must be completed before starting the subsequent action. As can be seen, steps 330, 340 and 350 are performed in parallel with steps 360, 370 and 380. The steps 330, 340 and 350 concern the main memory accesses. For a read operation, the main memory is accessed according to well known and well established methods (step 330), the data is retrieved using the requested memory address (step 340), and the retrieved data is sent to the CPU (step 350). All three steps are well known to those in the field. Steps 360, 370 and 380 refer to the copying of the read data into the buffer. First, a buffer entry with its MRU bit not set must be chosen (step 360). The non-active nature of its MRU bit means that it is not the last buffer entry accessed and, as such, may be overwritten. Once such a buffer entry has been chosen, the relevant data is written into the buffer entry (step 370). This relevant data includes the memory address properly positioned into the set and tag fields and the data read from the main memory. After this step, the MRU bit for this entry is set to prevent the buffer entry from being overwritten in the next memory access.

It should be noted that the data written into the data portion of the buffer entry is only the portion required. Thus, if the buffer is configured to buffer only the first 32 bytes of data, only that amount and portion of the data read from the main memory (from step 340) is written into the buffer entry. If the buffer is configured to store a full cache line, then this amount of information is extracted from the data from the main memory and stored in the buffer entry.

Again referring to FIG. 6, if the requested memory address is in the buffer (from decision 300), a decision is made (step 390) is made as to whether the memory access is a read or write. If it is a memory read, then again the temporal parallelism referred to above is taken advantage of. Steps 400, 410, and 420 refer to actions executed on or by the buffer while steps 430, 440 and 450 refer to steps executed by the main memory concurrent or parallel to those taken by the buffer.

As can be seen, step 400 refers to the reading of the relevant buffer entry. This involves reading the data stored in the data portion of the buffer entry. Then, step 410, sending the data read from the buffer entry to the CPU, is executed. Finally, the MRU bit for that buffer entry is set.

Concurrent to the above, the corresponding address location in the main memory is accessed using the requested memory address 430. The rest of the data is then read from the main memory using a preset offset. If the buffer is designed to store the first 32 bytes of data, the main memory data read is from 32 bytes past what would normally be the beginning of the memory read. Thus, if the memory read is to be from point X, then the main memory read would be from x+32 bytes to account for the data sent to the CPU from the buffer. Ordinarily, by the time the buffer has sent its data to the CPU, the set up time required to access the main memory has passed.

This therefore means that, as the CPU finishes receiving the data from the buffer, the rest of the requested data, coming from the main memory, is just arriving at the CPU. Step 450, that of actually sending the data to the CPU, is the last step executed for the main memory access.

On the other hand, if the memory access is a write access, steps 460, 470, 480, and 490 are executed. As can be seen from FIG. 6, steps 460 and 470 are executed in parallel to steps 480 and 490. In the step 460, the data to be written is written to the relevant buffer entry. Thus, the buffer entry found to correspond to the requested address is overwritten by the CPU supplied data. After this, the buffer entry's MRU bit is set to prevent the buffer entry from being overwritten in the next memory access. Concurrent to these steps, steps 480 and 490 concern main memory in step 490. Step 480 is where the main memory is accessed. It is during this step that the relevant and necessary signals are generated to access the main memory. It should be noted that no offset is required when writing the data to main memory in contrast to when reading the same data in step 440. The reason for this being that there is no need for an offset as the complete data is being written to main memory. By writing to both main memory and to the buffer, stale data issues are avoided.

The process described above yields best results when the buffer is designed to buffer only the beginning portion of requested data (i.e. the row head). However, this is not to say that storing a full cache line cannot be used for the above method. The buffer which stores a full cache line can also take advantage of the above method.

An added refinement to the concept of the above method is of maintaining an active row latched. A requested address will refer to a row in main memory. If that row is already active when a second requested address arrives, and if the second requested address refers to the same row, retrieving the data will be faster. This is because the setup time for accessing the requested row has been dispensed with—the row is already active. Combined with the buffer, the concept of maintaining a row latched offers multiple benefits in terms of accelerated memory access speeds.

Figure 7:
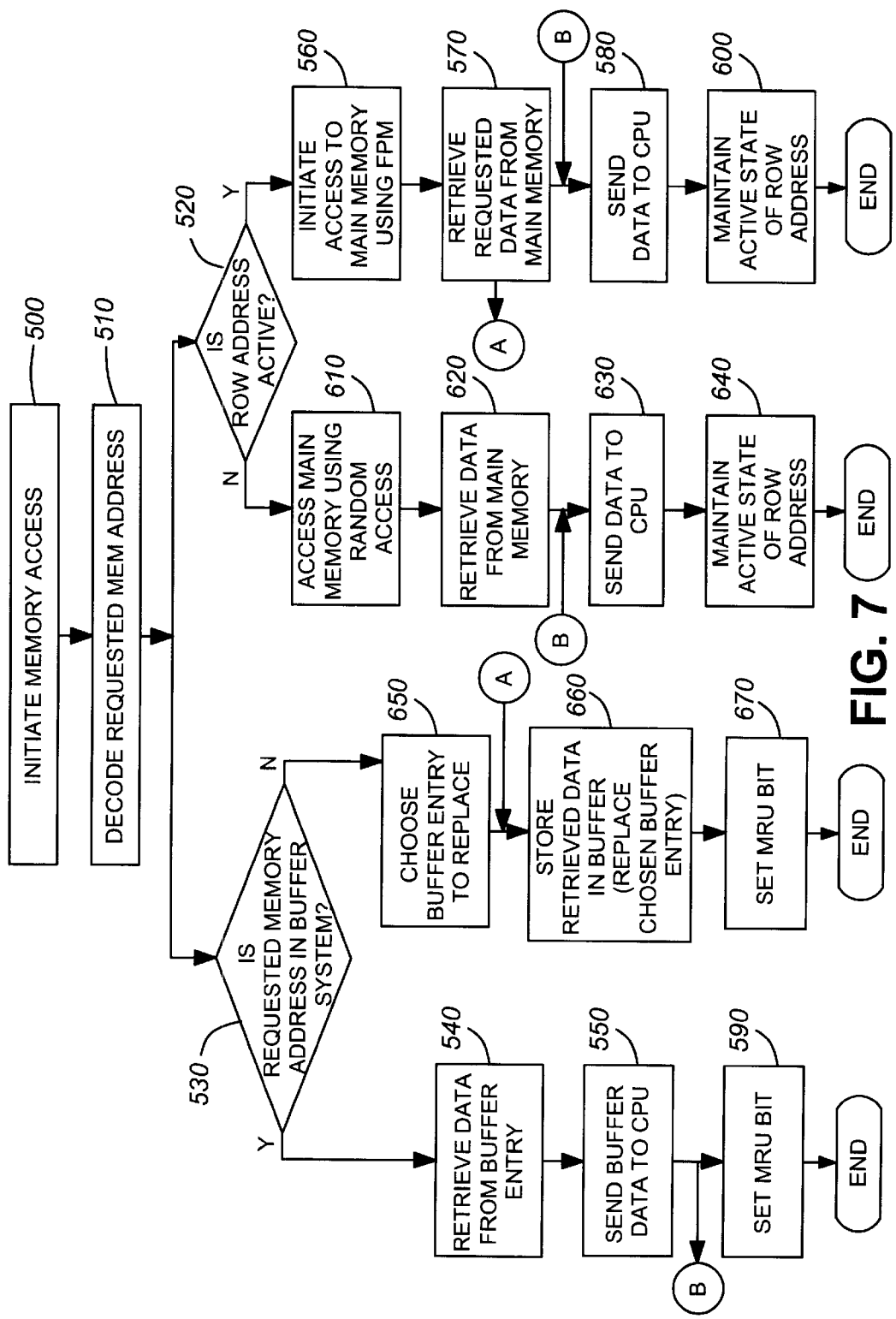
FIG. 7 is a flow chart detailing the steps in a method of memory access according to a second aspect of the invention.

Referring to FIG. 7, illustrated is a flowchart showing the steps in a process which can be executed using the memory controller of FIG. 5. This process to be used for read access uses the row latching concept referred to above. Starting at step 500, the memory access is initiated. This step includes receiving the requested memory access and determining that the memory access is a read access. Step 510 is then executed—this step involves decoding the requested memory access and determining which row the requested address is in. At this point, the process takes advantage of the temporal parallelism that the buffer affords. Steps 520 and 530 are executed concurrently. Thus, a check is made as to whether the requested row is already active and if the requested address is in the buffer.

If the buffer is configured to buffer only the beginning portion of the requested data i.e. the row head, the left most and right mostbranches of the flowchart of FIG. 7 can easily be performed concurrently. Assuming step 530 and 520 are both answered in the affirmative, steps 540, 550, 560, 570, 580, 590 and 600 can be executed in parallel. Thus, the first part of the data is retrieved from the buffer entry (step 540) and sent to the CPU (step 550). It should be noted that step 550 will be accomplished faster than if the row address were inactive. The normal activation time associated with accessing the main memory is avoided. Ideally this main memory access is accomplished using fast page mode (FPM). After accessing the first portion of the data from the buffer (i.e. the row head), the rest of the data requested is retrieved form main memory (step 570). However, this retrieval is done using an offset in a manner similar to that explained above to compensate for the data already sent to the CPU (step 540). Meanwhile, for the buffer, the accessed buffer entry has its MRU bit set. For the main memory, the active row is kept active for the next memory access. If the query of step 530 is answered in the affirmative but the query of step 520 is not, then steps 540, 550 and 590 are executed by the buffer while steps 610, 620, 630 and 640 are executed by the main memory system with the buffer and the main memory system operating in parallel. For the main memory system, step 610 is that of accessing the main memory using well known random access techniques. This involves sending the proper /CAS /RAS and /CS signals at the appropriate times. Step 620 is that of retrieving the rest of the requested data from main memory using a column offset to compensate for the data already supplied to the CPU in step 550 by the buffer. Step 630 is thus the sending of this retrieval data to the CPU. Step 640 is that of maintaining the active state of the row address in anticipation of the next memory access as this row address was activated when it was accessed.

If the query of step 520 is answered in the affirmative but step 530 is not, then the buffer executes steps 650, 660 and 670 while the main memory system executes steps 560, 570, 580 and 600. Thus, if the requested data is not in the buffer, then it must be entered. Step 650 is that of choosing a buffer entry to be replaced. This involves selecting a buffer entry whose MRU is not set. While this is being executed, the main memory system is retrieving the requested data from main memory (see steps 560 and 570 as described above) but with no offset. The offset is not used as the buffer is not sending the first portion of the requested data and there is therefore no need to compensate for this portion.

Once the data has been retrieved from main memory, the first portion of the retrieved data is then stored in the chosen buffer entry (see step 660). The MRU bit is then set for this buffer entry to prevent it being overwritten in the next memory access.

If both the queries of steps 520 and 530 are answered in the negative, then the main memory system executes steps 610, 620, 630 and 640 while the buffer executes steps 650, 660, and 670. Since the buffer is not being accessed to retrieve data but only to have data written to it, then step 620 for the main memory system does not use an offset as there is nothing to compensate for.

It should be noted that the connectors A and B in FIG. 7 serve to illustrate that while most of the steps detailed above can be executed in parallel, some steps need to be executed first before others. As an example, after step 550 is executed, steps 590, 580, and 600 are executed in parallel (see connector B). If, on other hand, step 520 yields a negative answer while step 530 yields a positive answer, after step 550 is executed then steps 590, 630, and 640 are executed in parallel (see connector B). Alternatively, if step 520 yields a positive answer while step 530 yields a negative answer, then connector A shows that steps 580 and 600 are executed in parallel with steps 660 and 670.

Figure 8:
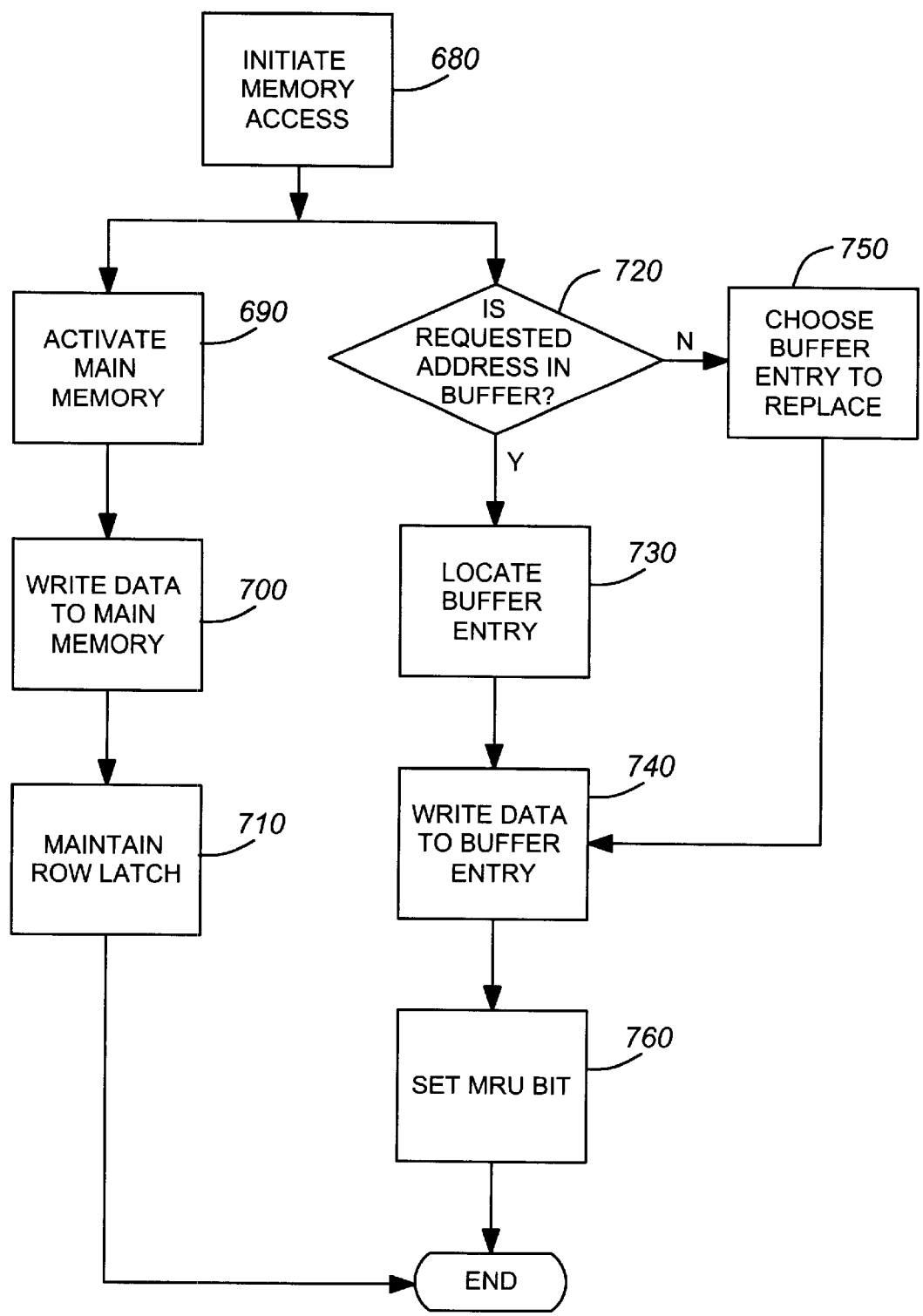
FIG. 8 is a flow chart detailing the steps for a write access method to be used with the method illustrated in FIG. 7.

Referring to FIG. 8, a flowchart of the steps followed for a write operation is illustrated. The process begins with a memory access initiate (step 680). As noted above, this includes decoding the requested address, receiving the write instruction from the CPU, and sending the requested address to the memory decoder and the buffer. Then, the main memory system executes steps 690, 700 and 710 in parallel to the buffer executing steps 720, 730 (if required), 740, 750 and 760.

For the main memory system, step 690 involves accessing the main memory, whether using FPM or not. The requested address is activated. In step 700 the data is written to the main memory and in step 710 the active state of the accessed row is maintained for the next memory access. (It should be noted that the number of active rows is left to the discretion of the system designers. Such a designer may wish to only have one row active per DRAM bank or have multiple active rows per bank.) For the buffer the first step is step 720, that of determining if the requested address is in the buffer. If the requested address is in the buffer, then the data is written (step 740) to that buffer entry. On the other hand, if the requested address is not in the buffer, then a buffer entry would have to be replaced. Thus, step 750 is choosing a buffer entry to be replaced. This entails choosing a buffer entry with its MRU bit not set. Then, once this buffer entry to be replaced is chosen, the data is written to it (step 740). It should be noted that the buffer entry written to in step 740 depends on whether the requested address is in the buffer. If it is, then the data is written to that buffer entry found. If not, then a buffer entry is chosen which will be replaced or overwritten. Then, once the data is written to the buffer entry the MRU for that buffer entry is set (step 760). The data is written to both the buffer and the main memory to preserve data coherence between the buffer and the main memory. It should be noted that in this example, only the beginning portion of the data (i.e. the row head) is written to the buffer as this is how the buffer is configured for this example.

The write process illustrated in the flowchart of FIG. 8 can also be used even if the buffer was configured to buffer a full cache line. The only difference between the present example and that explained above is that the full processor cache line is stored in the buffer.

Figure 9:
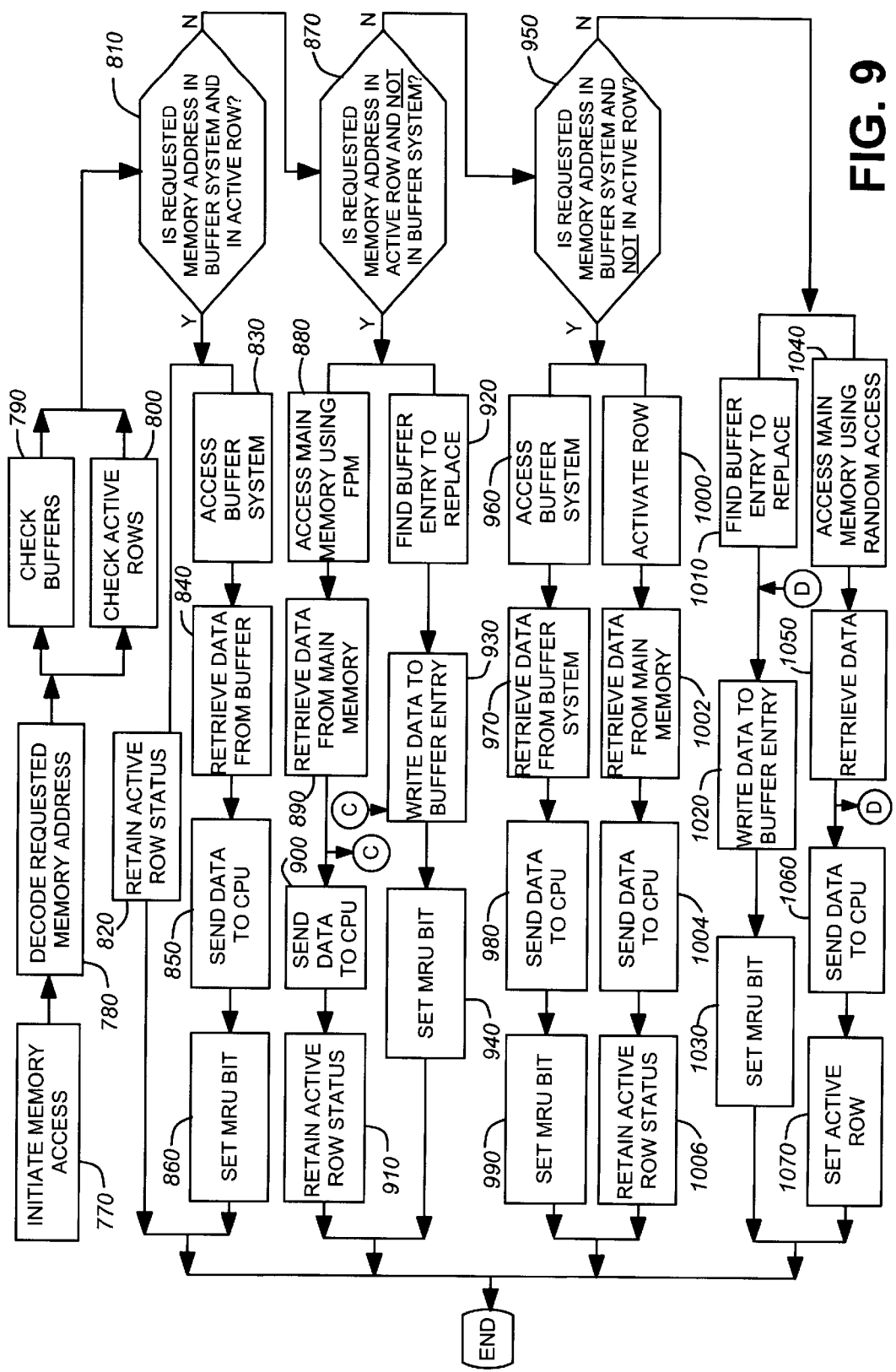
FIG. 9 is a flow chart detailing the steps in a method of memory access according to a third aspect of the invention.
Figure 10:
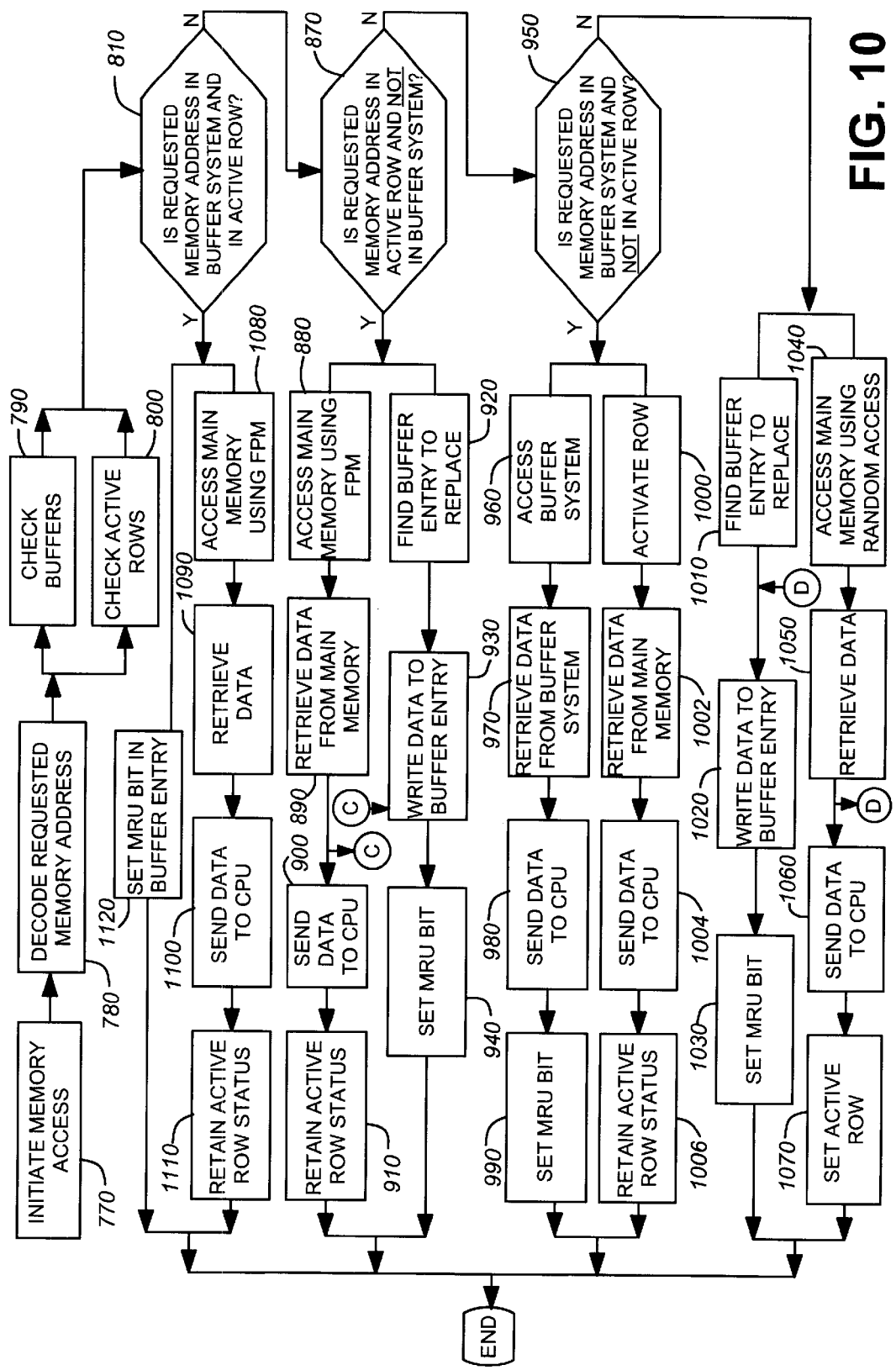
FIG. 10 is a flow chart detailing the steps in a variant of the method detailed in FIG. 9.

For read access with a buffer buffering the full cache line, a number of possibilities exist. As noted above, the memory controller of FIG. 5 with the extra ROW HIT and ROW LATCH signal would be used if the process of maintaining a row active after its access is used. FIGS. 9 and 10 illustrate two possible processes which are similar to that illustrated in FIG. 7. The exception is that the methods of FIGS. 9 and 10 have a default position if the requested address is found to be in the buffer and in an active row. In FIG. 9, if the requested address is found to be both in an active row and in the buffer, the data is retrieved from the buffer. In FIG. 10, if same is true, then the main memory is accessed.

Referring to both FIGS. 9 and 10, illustrated are two similar processes for read operations if the buffer is configured to buffer the full cache line and if the row latching concept is used. It should be noted that these two processes differ only when the requested address is both in the buffer and in an active row.

Referring to FIG. 9, the memory access is initiated in step 770 in a well known manner and similar to the memory access initiation in the other processes above. The requested memory address is then decoded in step 780. The next steps, 790 and 800, are then executed in parallel—the buffer is checked to see if the requested address is in the buffer (step 790) and the active row(s) are checked to see if the requested address is in an active row (step 800). Based on these checks, a series of decisions are made. Decision 810 checks if the requested address is in both the buffer and in an active row. If the answer is in the affirmative, then the two branches (step 820 in one and steps 830, 840, 850, and 860 in the other) are executed in parallel. Step 820 notes that the active status of the row found in step 800 is maintained. Steps 830, 840, 850, and 860 are executed in parallel in the buffer. Step 830 is that of accessing the buffer. Step 840 is that of actually retrieving the requested data from the buffer from a buffer entry which corresponds to the requested address. Then, this retrieved data is sent to the CPU (step 850). The MRU bit for the buffer entry found is then set in step 860 to prevent that buffer entry from being overwritten in the next memory access.

If the decision in step 810 is answered in the negative, decision 870 is then made. Step 870 determines if the requested address is in an active row and NOT in the buffer. If this is the case, the buffer executes steps 920, 930, 940 in parallel with the main memory system executing steps 880, 890, 900, and 910. For the main memory system, step 880 is that of accessing the main memory using fast page mode. This can be done as the requested address is in a row which is already active. The next step, 890, is that of retrieving the data from main memory. Step 900 is sending the retrieved data to the CPU while step 910 is of retaining the active status of the row. For the buffer, this portion of the process is accomplished to store the retrieved data in the buffer. Step 920 is that of choosing a buffer entry to be replaced. Once a buffer entry has been chosen, the data retrieved in step 890 is stored in the chosen buffer entry (step 930), thereby overwriting the old contents of the chosen buffer entry. Then, step 940, sets the MRU bit to prevent this particular buffer entry from being overwritten in the next data access. It should, however, be noted that connector C illustrates that only after step 890 can step 930 be executed. Only after the data is retrieved from main memory (step 890) can that data be written to the buffer entry (step 930).

If step 870 is answered in the negative, decision 950 is taken. This decision determines if the requested address is in the active row. If this is true, the buffer executes steps 960, 970, 980, and 990 in parallel with the main memory system executing steps 1000, 1002, 1004, and 1006. In the buffer, step 960 is setting up a buffer access. Step 970 is actually retrieving the requested data from the buffer while step 980 is sending that retrieved, requested data to the CPU. As in previous branches executed for the buffer, step 990 is setting the MRU bit to prevent the buffer entry from being overwritten in the next data access. It should be clear that the step of setting the MRU bit also involves unsetting the previously set MRU bit for another buffer entry. This way only one buffer entry has an MRU bit set. Similarly, the step of activating a row in main memory (step 1000) also involves de-activating a previously active row. This way a minimum of rows are active at one time. After the row is activated, the data is accessed from main memory as detailed in steps 1002. This data is then sent to the CPU (step 1004), and the active status of the row is maintained (step 1006). Depending on the configuration of the main memory system, only one row may be active in the whole main memory system or one row per main memory bank (for multiple bank main memory system) is active. Different configurations may be used, depending on the needs of the ultimate end user.

Again, if the decision in step 950 is answered in the negative, the main memory system and the buffer system execute a series of steps in parallel. For the buffer, the steps 1010, 1020, and 1030 are executed while for the main memory system steps 1040, 1050, 1060, and 1070 are executed. Step 1010 for the buffer involves finding a buffer entry with its MRU bit not set. The contents of this buffer entry are replaced with the new data to be retrieved. Step 1020 involves writing the retrieved data to the selected buffer entry, the retrieved data being retrieved by the main memory system in step 1050. Step 1030 is that of setting the MRU bit for the selected buffer entry.

For the main memory system, step 1040 is that of accessing the main memory for the data stored in the requested address. This memory access is to be done using well known random access methods as FPM cannot be used, given that the requested row is not active. Step 1050 involves retrieving the data from the main memory after the main memory had been accessed in step 1040. This retrieved data is then sent to the CPU in step 1060. It is this same data, or a portion thereof, that is written to the selected buffer entry in step 1020. Step 1070 then sets the accessed row (accessed in step 1040) as active so that the next memory access may be able to use FPM, if possible.

Similar to the connector C noted above, connector D shows that step 1020 can only be executed after step 1050 is executed. Thus, only after step 1050 is executed can step 1020 and any other subsequent steps in that branch be executed. Only after the data is retrieved from main memory (step 1050) can that same data be written to the buffer entry (step 1020).

For FIG. 10, all the steps in the flowchart are identical to FIG. 9 except for the steps taken if the first decision (step 810) is answered in the affirmative. If this is the case, meaning that the requested address is both in the buffer and in an active row, then the main memory executes steps 1080, 1090, 1100, and 1110 while the buffer executes step 1120.

For the main memory system step 1080 is that of accessing main memory using FPM. This can be done as the decision in step 810 determined that the requested address is in an active row. Step 1090, that of actually retrieving the data, is accomplished subsequent to step 1080. In step 1100, the retrieved data is sent to the CPU while step 1110 is that of retaining the active status of the row just accessed. For the buffer, step 1120 is that of setting the MRU bit for the buffer entry which corresponds to the requested address. This effectively says that that buffer entry was the last one accessed even though its contents were neither read nor modified.

Many other configurations of the above apparatus and processes are possible. A Level 2 cache can be used and access to it can be incorporated into the process outlined above.

A person understanding the above-described invention may now conceive of alternative designs, using the principles described herein. All such designs which fall within the scope of the claims appended hereto are considered to be part of the present invention.

I claim:

1. A method of retrieving data from a memory system, said method comprising:
   (a) receiving a read request for data contents of a memory location;
   (b) searching a buffer portion of said memory system for a portion of said data contents;
   (c) in the event that said portion of said data contents is stored in said buffer, retrieving said portion from said buffer while concurrently retrieving a remaining portion of said data contents from a main memory portion of said memory system; and
   (d) in the event that said portion of said data contents is not stored in said buffer, retrieving said portion and said remaining portion of said data contents from main memory.

2. A method as in claim 1 further including the following step:
   (e) if said portion of said contents is not stored in said buffer, storing said portion and said remaining portion of retrieved data contents in said buffer.

3. A method as in claim 2 wherein said portion of retrieved data content replaces an entry in said buffer.

4. A method as in claim 2 wherein:
   if a request to write data to a memory location is received, said data is written to said memory location in main memory and a portion of said data is written to said buffer.

5. A method as in claim 4 wherein said portion replaces an entry in said buffer.

6. A method as in claim 4 wherein said data is written concurrently to said memory location and to said buffer.

7. A method as in claim 1 wherein a memory row containing said memory location in main memory is latched whenever a read request for said memory location is received.

8. A method as in claim 1 wherein an entry in said buffer which has been most recently accessed is marked accordingly such that only one entry in said buffer is marked at any one time.

9. A method as in claim 5 wherein an entry in said buffer which has been most recently accessed is marked accordingly such that only one entry in said buffer is marked at any one time and said portion replaces an entry other than a marked entry in said buffer.

10. A method as in claim 1 further including maintaining a specific row active in each memory bank in said main memory, said specific row being the most recently accessed row in each memory bank.

11. A row head buffer circuit for latching a row head, a row head being a portion of a memory row stored in a memory bank, said latching circuit comprising:
    a row head buffer containing a plurality of row head entries, each row head entry corresponding to a row head in a memory bank;
    a plurality of row address latches, each row address latch latching a physical address of a row head entry contained in the row head buffer;
    a row address comparator for comparing row head entries with an incoming requested row address,
    wherein
    said buffer circuit compares an incoming row address requested by a memory controller with said plurality of row address latches, in the event an incoming requested row address matches one of said plurality of address latches, a row head data entry corresponding to a matching address latch is transmitted to said memory controller.

12. A buffer circuit as in claim 11 wherein said mechanism keeps active at least one row address per memory bank by sending at least one latched row address per memory bank to a memory controller.

13. A buffer circuit as in claim 11 wherein said buffer circuit keeps at least one memory bank active through said memory controller.

14. A memory buffer subsystem comprising:
    at least one buffer bank having multiple buffer entries; and
    a buffer controller controlling said buffer subsystem,
    wherein
    each buffer entry comprises:
        an address field containing a memory address corresponding to a location in a main memory bank;
        a data field containing the first n bytes of data is located at said main memory bank address;
        when said data located at said main memory bank address is requested by a CPU, said first n bytes of data is provided by said buffer subsystem to said CPU while the rest of said data is retrieved from said memory address in the main memory bank.

* * * * *